(12) United States Patent
Van den Bogaert et al.

(10) Patent No.: US 7,440,411 B2
(45) Date of Patent: Oct. 21, 2008

(54) ECHO REDUCTION TO ACHIEVE A REQUESTED SERVICE

(75) Inventors: Etienne André Hubert Van den Bogaert, Schaarbeek (BE); Jan Sylvia Verlinden, Wommelgem (BE); Philippe Jean Raymond Marie Antoine, Walhain (BE)

(73) Assignee: Alcatel, Paris (FR)

( * ) Notice: Subject to any disclaimer, the term of this patent is extended or adjusted under 35 U.S.C. 154(b) by 737 days.

(21) Appl. No.: 10/980,848

(22) Filed: Nov. 4, 2004

(65) Prior Publication Data

US 2005/0117561 A1 Jun. 2, 2005

(30) Foreign Application Priority Data

Dec. 1, 2003 (EP) .................................. 03292986

(51) Int. Cl.
*H04B 3/00* (2006.01)
(52) U.S. Cl. ........................................ 370/252; 370/286
(58) Field of Classification Search ................. 370/252, 370/286
See application file for complete search history.

(56) References Cited

U.S. PATENT DOCUMENTS

| 5,521,906 | A | 5/1996 | Grube et al. |
| 2001/0031014 | A1 | 10/2001 | Subramanian et al. |
| 2002/0118652 | A1* | 8/2002 | Ahmed et al. ............... 370/286 |
| 2003/0012364 | A1* | 1/2003 | Lee ............................ 379/402 |
| 2003/0202570 | A1 | 10/2003 | Bella et al. |
| 2004/0258172 | A1* | 12/2004 | Zhang ......................... 375/261 |

OTHER PUBLICATIONS

International Telecommunication Union (ITU), Telecommunication Standardization Sector of ITU (ITU-T), Series G: Transmission Systems and Media, Digital Systems and Networks, Digital transmission systems—Digital sections and digital line system-Access networks, "Asymmetric digital subscriber line (ADSL) transceivers" (Jun. 1999).
Nov. 2003 DSL Forum Talk in Paris (enclosed).
T1E1.4 Contribution 2003-325 dated Dec. 8-12, 2003.
T. Starr et al, DSL Advances, Prentice-Hall (2003 Edition).
George Ginis et al, "Vectored Transmission for Digital Subscriber Line Systems", IEEE JSAC special issue on twisted-pair transmission, vol. 20, Issue 5, pp. 1085-1104, Jun. 2002.

(Continued)

*Primary Examiner*—Melvin Marcelo
(74) *Attorney, Agent, or Firm*—Sughrue Mion, PLLC

(57) ABSTRACT

A method for determining transmission characteristics over a first communication path and a second communication path, while an amount of the signal transmitted over the first communication path couples into the second communication path. In case of excess of capacity over the first communication path and a shortage of capacity over the second communication path, the transmit power over said first communication path is decreased such that the requested service is met over both communication paths. This optimal transmit power can be determined by trying successive transmit power values until the requested service is met, e.g. by means of a dichotomy algorithm or the like. The optimal transmit power value can be computed directly as well, e.g. by making use of the transfer characteristics of the coupling path. A transceiver unit may also be used to implement the present method.

10 Claims, 4 Drawing Sheets

OTHER PUBLICATIONS

J. M. Cioffi, Chapter 4 "Generalized Decision-Feedback Equalization for Packet Transmission with ISI and Gaussian Noise" from *Communications, Control of Signal Processing: A Tribute to Thomas Kailath* (A. Paulraj et al, Ed.), Kluwer Academic Publishers, 1997.

T1E1.4 contribution 2002-069—Feb. 18, 2002.

T1E1.4 contribution 1992-203—Dec. 1, 1992.

A. Weissberger et al, "ADSL-DMT Out of Service Tests, Simplified Start-up Procedure(s), and Layer Management Protocols," Standards Project: ADSL Testing and Management, Brussels, Belgium; Sep. 16-17, 1997 (enclosed).

* cited by examiner

ECHO REDUCTION TO ACHIEVE A REQUESTED SERVICE

The present invention relates to a method for determining transmission characteristics over a first communication path and a second communication path, said first communication path originating from a first transceiver unit and terminating in a second transceiver unit, said second communication path originating from said second transceiver unit and terminating in said first transceiver unit, said method comprising the steps of:

determining in said second transceiver unit a first data rate achievable over said first communication path while a first signal is being applied to said first communication path with a first initial transmit power, sending said first data rate to said first transceiver unit, determining in said first transceiver unit a second data rate achievable over said second communication path while a second signal is being applied to said second communication path with a second initial transmit power, and while an amount of said first signal is coupling into said second communication path.

BACKGROUND OF THE INVENTION

Such a method is already known in the art, e.g. from the recommendation entitled "*Asymmetric Digital Subscriber Line (ADSL) Transceivers*", ref. G.992.1, published by the International Telecommunication Union (ITU) in June 1999.

FIG. 1 depicts two Digital Subscriber Line (DSL) transceiver units TU1 and TU2 connected to each other via a twisted pair of copper wires L. The transceiver unit TU1 is housed in a Digital Subscriber Line Access Multiplexer (DSLAM) at a central office CO, while the transceiver unit TU2 sites at customer premises CP.

A first communication path PATH1 is established over the line L from the transceiver unit TU1 to the transceiver unit TU2, and a second communication path PATH2 is established over the line L from the transceiver unit TU1 to the transceiver unit TU2.

The direction of communication from the central office CO to the customer premises CP is referred to as the downstream direction. The direction of communication from the customer premises CP to the central office CO is referred to as the upstream direction.

DSL transceiver units make use of Frequency Domain Division (FDD) to achieve duplex communication over a shared medium. Upstream and downstream directions are assigned disjoint frequency bands.

Frequency allocation for Very high speed Digital Subscriber Line (VDSL) is depicted in FIG. 2, where downstream and upstream directions are denoted as DS and US respectively. It is noteworthy that upstream direction is assigned higher frequency bands than downstream direction is.

Attenuation on most physical channels increases with both frequency and distance. It might be difficult to achieve a certain target data rate over long lines and/or at high frequencies.

The maximum data rate that can be achieved over a communication path is given by the well-known Shannon formula, and is a function of the Signal-to-Noise Ratio (SNR).

DSL transceiver units accommodate a Low Noise Amplifier (LNA) with Automatic Gain Control (AGC) that automatically tunes the analog gain in order to fit the received signal within the range of the Analog-to-Digital Converter (ADC), thereby minimizing the quantization noise engendered by the ADC.

DSL transceiver units further accommodate an hybrid that separates the transmit or near-end signal going to the line from the receive or far-end signal coming from the line. Unfortunately, the hybrid has no perfect echo rejection and an amount of the near-end signal mixes with the far end signal.

In VDSL, emphasis was put on flexibility for the allocation of the 138 kHz-12 MHz frequency band to upstream and downstream communication. The drawback of this flexible design is the inability to separate in the analog domain the local echo from the far-end signal. The echo will then contribute to the average receive power as measured for AGC.

The disclosed method is disadvantageous for long lines. The far end signal is very small and decreasing with line length, the quantization noise is constant because it is mostly determined by the echo. This means that the SNR, and thus the capacity, is decreasing until, at a certain line length, the requested target data rate can no longer be achieved.

The effect of attenuation will be different for upstream and downstream direction. The more bands of higher frequency are used for a certain communication direction, the more this direction will be affected by the attenuation and the higher the loss in capacity will be for this direction. As a consequence, the requested service will typically not be met in only one of the two directions.

SUMMARY OF THE INVENTION

It is an object of the present invention to meet the requested service in both directions.

According to the invention, this object is achieved due to the fact that, in the event of said first data rate being strictly higher than a first target data rate and said second data rate being strictly lower than a second target data rate, said method further comprises the step of determining an optimal transmit power over said first communication path lower than said first initial transmit power such that capacity of said second communication path is increased beyond said second target data rate while capacity of said first communication path is kept higher than or equal to said first target data rate.

In case of excess capacity in one direction of communication—call this direction A—, and shortage of capacity in the opposite direction—call this direction B—, the transmit power used in direction A is reduced, thereby reducing the echo generated in direction B, and thus the average receive power as measured for AGC. The gain of the LNA can be increased while keeping the clipping rate of the ADC within the allowed limits, thereby increasing the SNR, and thus the capacity, in direction B. If there is enough excess capacity in direction A, the transmit power can be decreased down to a value, the so-called optimal transmit power, whereby target data rates are achieved in both directions A and B.

A longer reach for deployment can be achieved whereby both directions meet the requested service. In case the method is applied to VDSL, the gain is estimated at an increase for the reach of 5% to 10%. Without the proposed method, upstream communication would fail on long lines.

It is to be noticed that there is not a single transmit power value whereby target data rates are achieved in both directions, but rather a continuous range of values wherein said optimal transmit power value is enclosed.

Said optimal transmit power can be determined in various ways.

In one embodiment of the present invention, said method further comprises the steps of:

determining an intermediate transmit power between a lower bound transmit power and said first initial transmit power, determining in said second transceiver unit a third data rate achievable over said first communication path while a third signal is being applied to said first communication path with said intermediate transmit power, sending said third data rate to said first transceiver unit, determining in said first transceiver unit a fourth data rate achievable over said second communication path while a fourth signal is being applied to said second communication path with said second initial transmit power value, and while an amount of said third signal is coupling into said second communication path, until said fourth data rate is increased beyond said second target data rate while said third data rate is kept higher than or equal to said first target data rate, thereby determining in the limit said optimal transmit power.

With this embodiment, the transceiver units are released from the burden of computing the optimal transmit power, but rather rely upon the channel capacity as measured by each transceiver unit.

The first transceiver unit tries successive transmit power values until the channel capacity as measured by each transceiver unit exceeds their respective target data rate.

The intermediate transmit power values are determined by means of a dichotomy algorithm or the like.

In another embodiment of the present invention, said method further comprises the steps of:
  determining directly in said first transceiver unit said optimal transmit power with as inputs:
    a necessary signal-to-quantization-noise ratio to achieve said second target data rate over said second communication path,
    transfer characteristics of a coupling path from said first communication path to said second communication path,
  determining therefrom a corresponding data rate achievable over said first communication path,
  checking whether said corresponding data rate is higher than or equal to said first target data rate.

The transfer characteristics of the coupling path is interalia an impulse system response. The transfer characteristics can be acquired from a remote server, or pushed into a non-volatile memory area at manufacturing time, or can be preliminarily measured, e.g. while no signal is transmitted over said second communication path, or while said first transceiver unit is temporarily disconnected from said second communication path.

With this embodiment, the optimal transmit power is determined at once, without going through intermediate steps, yet at the expense of some additional computational complexity.

In still another embodiment of the present invention, the capacity of the communication paths is determined while the communication paths are being initialized, e.g. during the so-called channel analysis step for DSL transceiver units. Yet, in another embodiment, the capacity of the communication paths is determined while the communication paths are operational.

The present invention also relates to a transceiver unit comprising:
  a transmitter adapted to originate a transmit path terminating in a peer transceiver unit,
  a receiver adapted to terminate a receive path originating from said peer transceiver unit,
  a communication means coupled to said receiver, and adapted to receive from said peer transceiver unit a first data rate achievable over said transmit path, said first data rate being determined by said peer transceiver unit while a first signal is being applied to said transmit path with a first initial transmit power,
  a channel analyzer coupled to said receiver, and adapted to determine a second data rate achievable over said receive path while a second signal is being applied to said receive path with a second initial transmit power, and while an amount of said first signal is coupling into said receive path.

A transceiver unit according to the present invention further comprises an echo reduction agent coupled to said channel analyzer, to said communication means and to said transmitter, and adapted, in the event of said first data rate being strictly higher than a first target data rate and said second data rate being strictly lower than a second target data rate, to determine an optimal transmit power over said transmit path lower than said first initial transmit power such that capacity of said receive path is increased beyond said second data rate while capacity of said transmit path is kept higher than or equal to said first target data rate.

Further characterizing embodiments of the transceiver unit are mentioned in the appended claims.

The scope of the present invention is not limited to DSL transceiver unit, but is applicable to any kind of transceiver unit wherein an amount of the transmit signal couples into the receive path.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

Figure 1:
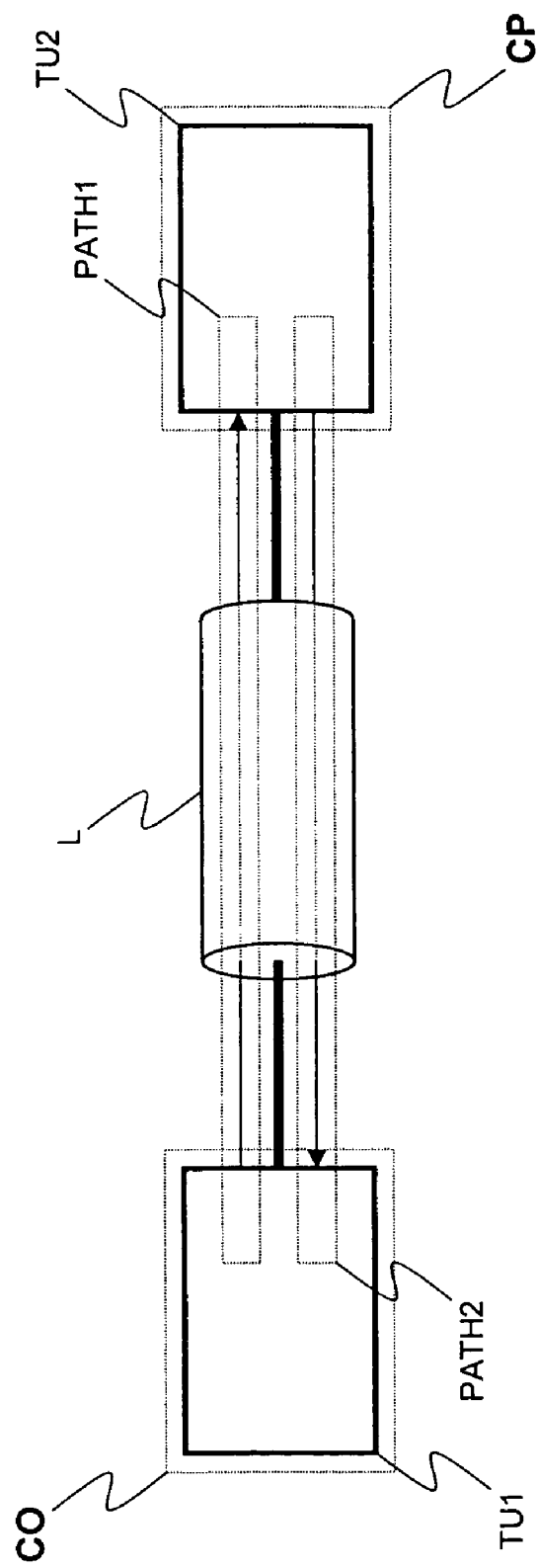
FIG. 1 represents two DSL transceiver units connected to each other via a twisted pair of Copper wires.
Figure 2:
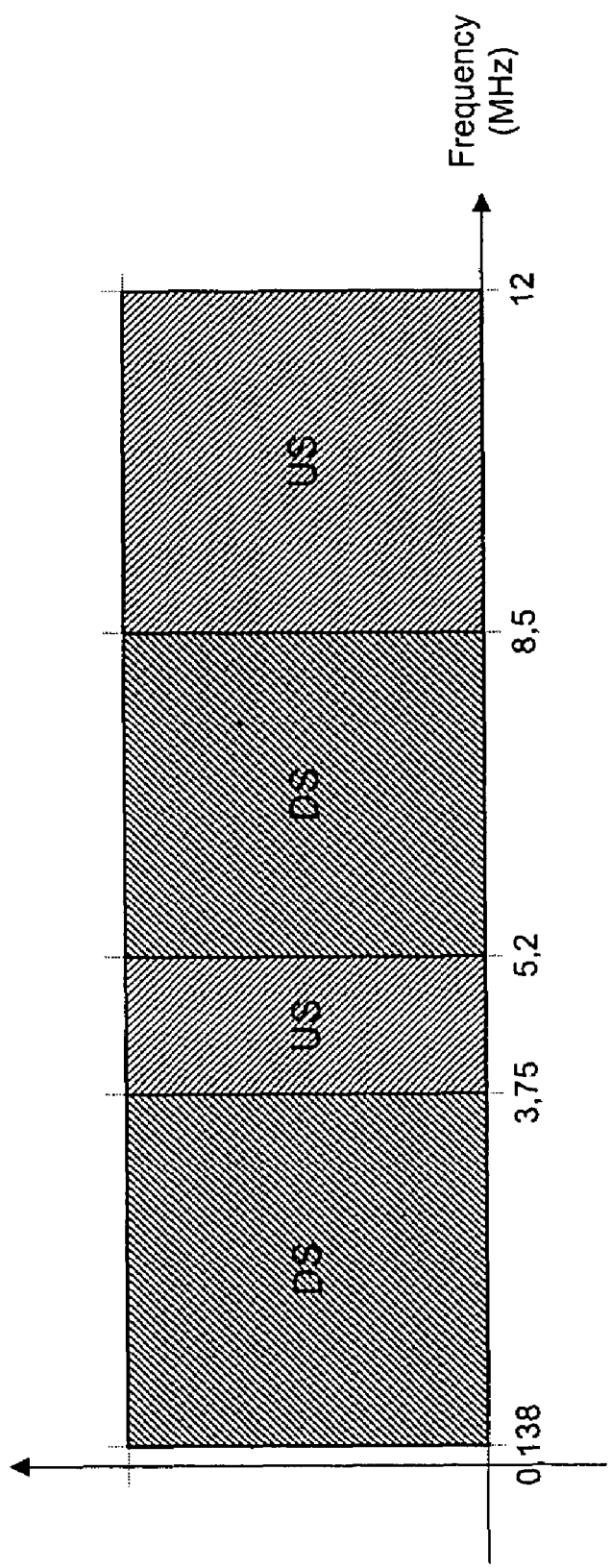
FIG. 2 represents frequency allocation for VDSL.

In a preferred embodiment of the present invention, the transceiver unit TU1 is an ADSL transceiver unit.

DETAILED DESCRIPTION OF EXEMPLARY EMBODIMENTS OF THE INVENTION

The transceiver unit TU1 comprises the following functional blocks (see FIG. 3):
  a transmitter TX,
  a receiver RX,
  a hybrid circuit H,
  a line adaptator T, a communication means COM,
a channel analyzer ANAL,
an echo reduction agent ERA.

The transmitter TX and the receiver RX are both coupled to the hybrid circuit H. The hybrid circuit H is coupled to the line adaptator T. The communication means COM is coupled to both the transmitter TX and the receiver RX. The channel analyzer ANAL is coupled to the receiver RX. The echo reduction agent is coupled to the channel analyzer ANAL, the communication means COM and the transmitter TX.

The transmitter TX accommodates the necessary means for encoding user and control data, and for modulating DSL tones with the so-encoded data.

The transmitter TX comprises the following functional blocks (see FIG. 3):
a frequency-to-time-domain converter FTC,
a digital-to-analog converter DAC,
a programmable gain amplifier PGA.

The frequency-to-time-domain converter FTC is coupled to the digital-to-analog converter DAC. The digital-to-analog converter DAC is coupled to the programmable gain amplifier PGA. The programmable gain amplifier PGA is coupled to the hybrid circuit H.

The frequency-to-time-domain converter FTC is adapted to synthesize a signal from its frequency components. The frequency-to-time-domain converter FTC makes use of the Inverse Discrete Fourier Transform (IDFT) synthesis equation.

The digital-to-analog converter DAC is adapted to convert a digital sequence of binary samples into an analog signal.

The programmable gain amplifier PGA is adapted to amplify an analog signal. The amplification of the amplifier PGA is assumed linear within the considered frequency range. Denote its amplification gain as $\beta$.

The receiver RX accommodates the necessary means for demodulating a DMT signal, and for decoding user and control data from the so-demodulated signal.

The receiver RX comprises the following functional blocks (see FIG. 3):
a low-noise amplifier LNA,
a automatic gain controller AGC,
a analog-to-digital converter ADC,
a time-to-frequency-domain converter TFC.

The low-noise amplifier LNA is coupled to the hybrid circuit H. The automatic gain controller AGC is coupled to the low-noise amplifier LNA. The analog-to-digital converter ADC is coupled to the low-noise amplifier LNA. The time-to-frequency-domain converter TFC is coupled to both the low-noise amplifier LNA and the channel analyzer ANAL.

The low noise amplifier LNA is adapted to amplify very small signals, while introducing as little amplification noise as possible. The amplification of the low noise amplifier LNA is assumed linear within the considered frequency range. Denote its amplification gain as $\alpha$.

The automatic gain controller AGC is adapted to determine the gain $\alpha$ of the low noise amplifier LNA in order to fit the output signal from the low noise amplifier LNA within the range of the analog-to-digital converter ADC. The automatic gain controller AGC measures the average power of the received signal and compares it with the full scale power value of the analog-to-digital converter ADC. The average power of the received signal can be measured in the time domain by means of an analog integrator circuit, or in the frequency domain by interfacing with the time-to-frequency-domain converter TFC.

The analog-to-digital converter ADC is adapted to sample and to quantize an analog signal, thereby producing a digital sequence of binary samples. The analog-to-digital converter ADC is a (B+1)-bit uniform converter with a full scale value $V_M$.

The time-to-frequency-domain converter TFC is adapted to analyze a signal into frequency components. The time-to-frequency-domain converter TFC makes use of the Discrete Fourier Transform (DFT) analysis equation.

Figure 3:
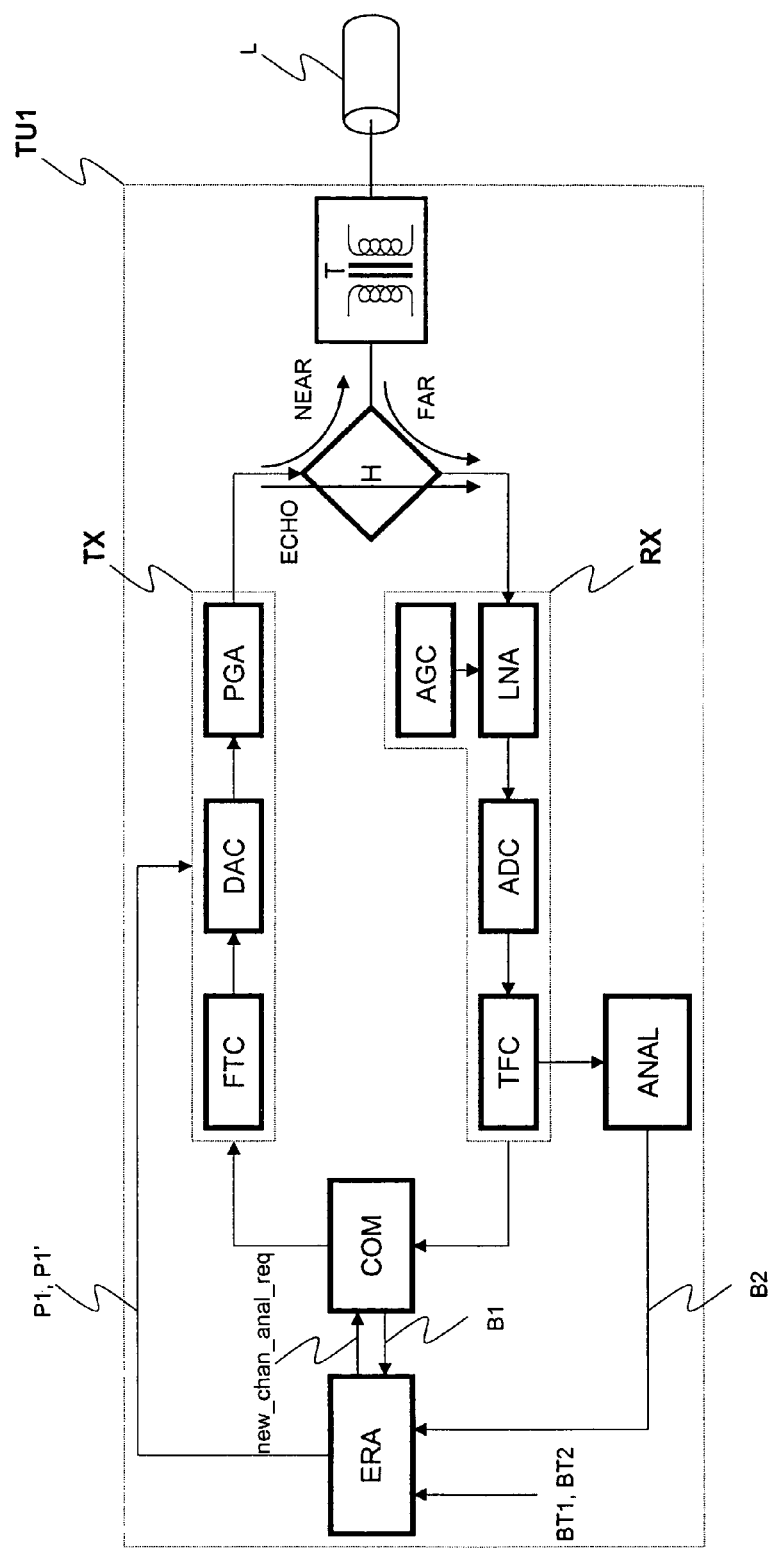
FIG. 3 represents the transceiver unit TU1 according to the present invention.

The hybrid circuit H is adapted to couple the transmitter unit TX's output to the twisted pair L (see NEAR signal in FIG. 3), and the twisted pair L to the receiver unit RX's input (see FAR signal in FIG. 3).

The hybrid circuit H accommodates an echo cancellation means to avoid the transmitted unit TX's signal to couple into the receiver unit RX's input. Notwithstanding this echo cancellation means, an amount of the transmitted unit TX's signal couples into the receiver unit RX's input (see ECHO signal in FIG. 3).

The line adaptator T is adapted to isolate the transceiver unit TU1 from the twisted pair L, and to adapt the input and output impedance of the transceiver unit TU1 to the line characteristic impedance.

The communication means COM provides data exchange capabilities with a peer transceiver unit. The communication means COM accommodates the necessary means for checking and guaranteeing message integrity.

More specifically, the communication means COM is adapted to receive from a peer transceiver unit a bit loading b1(k) and a relative power gain g1(k) for each tone k used over the transmit path.

The bit loading b1(k) and the relative power gain g1(k) are determined during the channel analysis step, and while a pseudo-random binary signal is being applied to the transmit path with a reference transmit power P1.

The total bit rate B1 achievable over the transmit path is thus given by:

$$B1 = \left(\sum_k b1(k)\right) \times \text{symbol\_rate} \qquad (1)$$

The channel analyzer ANAL is adapted to determine a bit loading b2(k) and a relative power gain g2(k) for each tone k used over the received path.

The bit loading b2(k) and the relative power gain g2(k) are determined during the channel analysis step, and while a pseudo-random binary signal is being applied to the receive path with a reference transmit power P2.

The total bit rate B2 achievable over the receive path is thus given by:

$$B2 = \left(\sum_k b2(k)\right) \times \text{symbol\_rate} \qquad (2)$$

The echo reduction agent ERA is adapted to determine an optimal transmit power P1' such that a target bit rate BT1 is achieved over the transmit path, and such that a target bit rate BT2 is achieved over the receive path.

Figure 4:
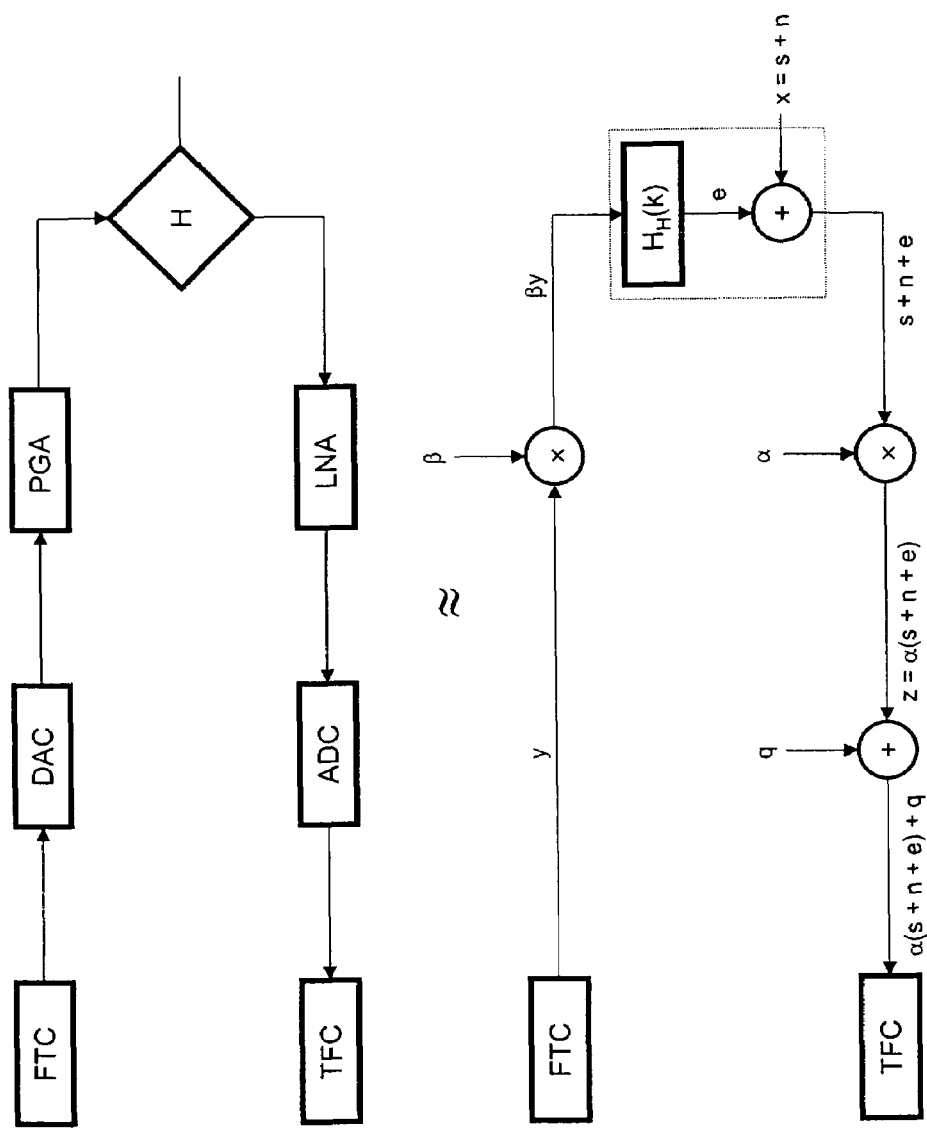
FIG. 4 represents a workable model of the trasmit and receive paths within the Transceiver unit TU1.

The echo reduction agent ERA proceeds as follows (see FIG. 4).

Denote the receive signal as x. Denote the signal and noise components of the receive signal x as s and n respectively.

Denote the echo the hybrid circuit H introduces into the received signal x as e.

Denote the quantization noise as q.

Denote the total noise component received at the input of the converter TFC as $\hat{n}$:

$$\hat{n} = \alpha(n+e) + q \qquad (3)$$

Denote the DFT of a signal with uppercase.

The LNA gain $\alpha'$ required to load 1 bit more on tone k is determined as follows.

We have from the Shannon formula:

$$b2(k) = \log_2\left(1 + \frac{\alpha^2 |S(k)|^2}{\Gamma |\hat{N}(k)|^2}\right) \qquad (4)$$

$$b2(k) + 1 = \log_2\left(1 + \frac{\alpha'^2 |S(k)|^2}{\Gamma |\hat{N}'(k)|^2}\right) \qquad (5)$$

The signal-to-noise ratio reduced approximately to the signal-to-quantization-noise ratio, the echo component being digitally filtered out, and the receive noise n being negligible compared to the quantization noise q.

We derive the following property:

$$\hat{N}'(k) = N(k) \qquad (6)$$

and $$2 = \frac{1 + \frac{\alpha'^2 |S(k)|^2}{\Gamma |\hat{N}(k)|^2}}{1 + \frac{\alpha^2 |S(k)|^2}{\Gamma |\hat{N}(k)|^2}} \approx \frac{\alpha'^2}{\alpha^2} \qquad (7)$$

An increase of 3 dB causes an increase of about 1 bit/tone×symbol.

A similar development applies in the opposite direction, that is to say halving the transmit power causes a decrease of about 1 bit/tone×symbol over the transmit path.

Knowing the initial LNA gain $\alpha$ and the measured total bit rate B2, we can determine a new gain $\alpha'$ to achieve the target bit rate BT2:

$$b2'(k) = \log_2\left(1 + \frac{\alpha'^2 |S(k)|^2}{\Gamma |\hat{N}(k)|^2}\right) > b2(k) \text{ if } \alpha' > \alpha \qquad (8)$$

$$B2' = \left(\left(\sum_k b2'\right)(k)\right) \times \text{symbol\_rate} > BT2 \qquad (9)$$

The transmit power value P1' that allows the automatic gain controller AGC to boost the LNA gain to $\alpha'$ is determined as follows.

Denote the signal transmitted at the output of the converter FTC as y.

Denote the frequency response of the hybrid circuit H from the transmit path to the receive path as $H_H(k)$ (the hybrid circuit H is assumed to be a linear time-invariant system).

Denote the signal received at the input of the converter ADC as z:

$$z = \alpha(s + n + e) \qquad (10)$$

The AGC is such that the crest factor, defined as $$X = \frac{P_z}{P_q},$$

is kept constant (P denotes the power of the respective signal).

The average power of the quantization noise is given by:

$$P_q = \frac{V_M^2}{12 \times 2^{2B}} \qquad (11)$$

$P_q$ is constant irrespective of the signal to be converted. Hence, the AGC is such that $P_z$ is kept constant.

Assume that n and e are statistically independent random processes with zero-mean. The average power of their sum matches the sum of their average power:

$$P_z = \alpha^2 P_s + \alpha^2 P_n + \alpha^2 P_e \qquad (12)$$

The signal and noise components s and n remaining alike, we have:

$$P_{z'} = \alpha'^2 P_s + \alpha'^2 P_e + \alpha'^2 P_n = P_z \qquad (13)$$

$P_s$ and $P_n$ have been initially measured for the determination of the total bit rate B2.

$P_z$ has been measured too for the computation of the initial LNA gain $\alpha$.

Thus:

$$P_{e'} = \frac{P_z}{\alpha'^2} - P_s - P_n < P_e \text{ if } \alpha' > \alpha \qquad (14)$$

Assuming the digital-to-analog and the analog-to-digital conversion cancel each other (see FIG. 3), we have from the Parseval's theorem:

$$P_{e'} = \beta'^2 \sum_k |Y'(k)|^2 |H_H(k)|^2 \qquad (15)$$

The echo reduction agent ERA can indistinctly decrease the PGA gain ($\beta' < \beta$), or decrease the transmit PSD (Y'(k)<Y(k)), or both of them.

The echo reduction agent ERA determines a new PGA gain $\beta'$ or a new transmit PSD Y'(k) by means of equation (8), (9), (14) and (15), thereby determining the optimal transmit power P1'.

The echo reduction agent ERA next checks whether the target data rate BT1 is still achieved over the transmit path.

The echo reduction agent ERA makes use of the foregoing development. The new total bit rate B1' achievable over the transmit path with the optimal transmit power P1' is given by:

$$B1' = B1 + \left(K1 \times \log_2\left(\frac{P1'}{P1}\right)\right) \times \text{symbol\_rate} < B1 \text{ if } P1' < P1 \qquad (16)$$

where K1 denotes the number of tones used over the transmit path.

The echo reduction agent ERA checks whether B1' is still greater than or equal to BT1.

If so, the echo reduction agent ERA further requests the peer transceiver unit via the communication means COM to perform a further channel analysis step, by means of a newly defined message, or by means of an existing message with additional information elements (see new_chan_anal_req in FIG. 3).

The transceiver unit TU1 uses the so-determined optimal transmit power as reference transmit power during this further channel analysis step.

In an alternative embodiment of the present invention, the channel analyzer ANAL measures the average power Pe of the echo signal ECHO, while no signal is being transmitted over the receive path, e.g. during the so-called handshake procedure, or while half-duplex communication is taking place over the line L.

Therefrom, the echo reduction agent ERA determines the transmit power attenuation to achieve $P_e$, as given by equation (14), and thus the target bit rate BT2 over the receive path.

With this embodiment, the echo reduction agent ERA does not need to load some pre-determined transfer characteristics of the hybrid circuit H, but rather relies on actual measurements.

In an alternative embodiment of the present invention, the transceiver unit TU1 stores the so-determined optimal transmit power in a non-volatile memory area, aborts the current initialization procedure, reboots and carry out a new initialization procedure with the optimal transmit power as reference transmit power.

In an alternative embodiment of the present invention, the transceiver unit TU1 determines new bit loading values b1'(k) corresponding to the new total bit rate B1', e.g. by spreading the channel capacity cutback B1-B1' equally over all the tones. The transceiver unit TU1 sends the new bit loading values b1'(k) to the peer transceiver unit via the communication means COM, by means of a newly defined message, or by means of an existing message with additional information elements. These new bit loading values are used right away after the initialization procedure completes, without the need for a new (whole/partial) initialization procedure.

In an alternative embodiment of the present invention, the echo reduction agent ERA determines the optimal transmit power P1' by trying successive transmit power values.

Those values are initially enclosed in an interval $[P1_{INF}; P1]$, where $P1_{INF}$ denotes a pre-determined lower bound transmit power value.

The echo reduction agent ERA makes use of a dichotomy algorithm, starting with the initial value $P1_1=P1$, next $P1_2=(P1_{INF}+P1)/2$, and so on, until the target data rates BT1 and BT2 are achieved over both transmit and receive paths.

The echo reduction agent ERA proceeds as follows.

Denote $P1_n$ the reference transmit power value used during the $n^{th}$ channel analysis step.

Denote $B1_n$ the total bit rate achievable over the transmit path, $B1_n$ being measured by the peer transceiver unit during the $n^{th}$ channel analysis step and passed to the echo reduction agent ERA via the communication means COM.

Denote $B2_n$ the total bit rate achievable over the receive path, $B2_n$ being measured by the channel analyzer ANAL during the $n^{th}$ channel analysis step and passed to the echo reduction agent ERA.

Denote the interval wherein the optimal transmit power is expected to be at each step of the dichotomy algorithm as $[P1_{MIN}; P1_{MAX}]$.

Initially (n=1):
$P1_1=P1$
$B1_1==B1>BT1$
$B2_1=B2<BT2$
$P1_{MIN}=P1_{INF}$
$P1_{MAX}=P1$ If $B1_n>BT1$ and $B2_n<BT2$ then:
$P1_{n+1}=(P1_{MIN}+P1_n)/2$
$P1_{MIN}$ unchanged
$P1_{MAX}=P1_n$ If $B1_n<BT1$ and $B2_n>BT2$ then:
$P1_{n+1}=(P1_n+P1_{MAX})/2$
$P1_{MIN}=P1_n$
$P1_{MAX}$ unchanged The dichotomy algorithm carries on until $B1_n>BT1$ and $B2_n>BT2$, thereby determining the optimal transmit power value P1'.

The echo reduction agent ERA either:
  requests the peer transceiver unit via the communication means COM to perform a further channel analysis step, the next determined value being used as reference transmit power during this further channel analysis step,
  aborts the current initialization procedure, and carry out a new initialization procedure with the next determined value.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for determining transmission characteristics over a first communication path (PATH1) and a second communication path (PATH2), said first communication path originating from a first transceiver unit (TU1) and terminating in a second transceiver unit (TU2), said second communication path originating from said second transceiver unit and terminating in said first transceiver unit, said method comprising the steps of:
  determining in said second transceiver unit a first data rate (B1) achievable over said first communication path while a first signal (NEAR) is being applied to said first communication path with a first initial transmit power (P1),
  sending said first data rate to said first transceiver unit,
  determining in said first transceiver unit a second data rate (B2) achievable over said second communication path while a second signal is being applied to said second communication path with a second initial transmit power (P2), and while an amount of said first signal is coupling into said second communication path (ECHO),
  characterized in that, in the event of said first data rate being higher than a first target data rate (BT1) and said second data rate being lower than a second target data rate (BT2), said method further comprises the step of determining an optimal transmit power (P1') over said first communication path lower than said first initial transmit power such that capacity of said second communication path is increased beyond said second target data rate while capacity of said first communication path is kept higher than or equal to said first target data rate.

2. A method according to claim 1, characterized in that said method further comprises the steps of:

determining an intermediate transmit power between a lower bound transmit power and said first initial transmit power, determining in said second transceiver unit a third data rate achievable over said first communication path while a third signal is being applied to said first communication path with said intermediate transmit power, sending said third data rate to said first transceiver unit, determining in said first transceiver unit a fourth data rate achievable over said second communication path while a fourth signal is being applied to said second communication path with said second initial transmit power value, and while an amount of said third signal is coupling into said second communication path, until said fourth data rate is increased beyond said second target data rate while said third data rate is kept higher than or equal to said first target data rate, thereby determining in the limit said optimal transmit power.

3. A method according to claim 2, characterized in that said intermediate transmit power is determined by means of a dichotomy algorithm.

4. A method according to claim 1, characterized in that said method further comprises the steps of:

determining directly in said first transceiver unit said optimal transmit power with as inputs:

a necessary signal-to-quantization-noise ratio to achieve said second target data rate over said second communication path, transfer characteristics ($H_H(k)$) of a coupling path from said first communication path to said second communication path, determining therefrom a corresponding data rate achievable over said first communication path, checking whether said corresponding data rate is higher than or equal to said first target data rate.

5. A method according to claim 1, characterized in that said first data rate, said second data rate respectively, is determined while said first communication path, said second communication path respectively, is being initialized.

6. A transceiver unit (TU1) comprising:

a transmitter (TX) adapted to originate a transmit path (PATH1) terminating in a peer transceiver unit (TU2), a receiver (RX) adapted to terminate a receive path (PATH2) originating from said peer transceiver unit, a communication means (COM) coupled to said receiver, and adapted to receive from said peer transceiver unit a first data rate (B1) achievable over said transmit path, said first data rate being determined by said peer transceiver unit while a first signal is being applied to said transmit path with a first initial transmit power (P1), a channel analyzer (ANAL) coupled to said receiver, and adapted to determine a second data rate (B2) achievable over said receive path while a second signal is being applied to said receive path with a second initial transmit power (P2), and while an amount of said first signal is coupling into said receive path (ECHO), characterized in that said transceiver unit further comprises an echo reduction agent (ERA) coupled to said channel analyzer, to said communication means and to said transmitter, and adapted, in the event of said first data rate being higher than a first target data rate (BT1) and said second data rate being lower than a second target data rate (BT2), to determine an optimal transmit power (P1') over said transmit path lower than said first initial transmit power such that capacity of said receive path is increased beyond said second data rate while capacity of said transmit path is kept higher than or equal to said first target data rate.

7. A transceiver unit according to claim 6, characterized in that said echo reduction agent is further adapted to determine an intermediate transmit power between a lower bound transmit power and said first initial transmit power, in that said communication means is further adapted to receive from said peer transceiver unit a third data rate, said third data rate being determined by said peer transceiver unit while a third signal is being applied to said transmit path with said intermediate transmit power, and in that said channel analyzer is further adapted to determine a fourth data rate while a fourth signal is being applied to said receive path with said second initial transmit power, and while an amount of said third signal is coupling into said receive path, until said fourth data rate is increased beyond said second target data rate while said third data rate is kept higher than or equal to said first target data rate, thereby determining in the limit said optimal transmit power.

8. A transceiver unit according to claim 7, characterized in that said intermediate transmit power is determined by means of a dichotomy algorithm.

9. A transceiver unit according to claim 6, characterized in that said echo reduction agent is further adapted:

to determine directly said optimal transmit power with as inputs:

a necessary signal-to-quantization-noise ratio to achieve said second target data rate over said receive path, transfer characteristics ($H_H(k)$) of a coupling path from said transmit path to said receive path, to determine therefrom a corresponding data rate achievable over said transmit path, to check whether said corresponding data rate is higher than or equal to said first target data rate.

10. A transceiver unit according to claim 6, characterized in that said first data rate, said second data rate respectively, is determined while said transmit path, said receive path respectively, is being initialized.

* * * * *